(12) United States Patent
Iannotti

(10) Patent No.: US 10,996,082 B2
(45) Date of Patent: May 4, 2021

(54) SENSOR SYSTEM FOR A ROTOR ASSEMBLY

(71) Applicant: General Electric Company, Schenectady, NY (US)

(72) Inventor: Joseph Alfred Iannotti, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 16/445,577

(22) Filed: Jun. 19, 2019

(65) Prior Publication Data

US 2020/0400466 A1 Dec. 24, 2020

(51) Int. Cl.
| | |
|---|---|
| *H01Q 1/22* | (2006.01) |
| *G01D 11/14* | (2006.01) |
| *G01B 7/14* | (2006.01) |
| *H01Q 3/02* | (2006.01) |
| *G06K 7/10* | (2006.01) |
| *G08C 17/02* | (2006.01) |

(52) U.S. Cl.
CPC ............... *G01D 11/14* (2013.01); *G01B 7/14* (2013.01); *G06K 7/10198* (2013.01); *G08C 17/02* (2013.01); *H01Q 1/2225* (2013.01); *H01Q 3/02* (2013.01)

(58) Field of Classification Search
CPC .............................. H01Q 1/2225; H01Q 3/02
See application file for complete search history.

(56) References Cited

U.S. PATENT DOCUMENTS

| | | |
|---|---|---|
| 9,760,748 B2 | 9/2017 | Iannotti et al. |
| 9,806,390 B2 | 10/2017 | Lee et al. |
| 10,225,026 B2 | 3/2019 | Lee et al. |
| 2017/0350253 A1 | 12/2017 | Jacobs et al. |
| 2018/0359004 A1 | 12/2018 | Lee et al. |

*Primary Examiner* — Graham P Smith
(74) *Attorney, Agent, or Firm* — Fitch, Even, Tabin & Flannery LLP

(57) ABSTRACT

A sensor system includes a rotor antenna, a radio frequency (RF) sensor, a stator antenna, and one or more processors. The rotor antenna and the RF sensor are configured to be disposed on a shaft of a rotor assembly and are conductively connected to each other. The RF sensor generates measurement signals. The stator antenna is mounted to a stator member of the rotor assembly and positioned radially outward from the rotor antenna. The stator antenna is wirelessly connected to the rotor antenna across an air gap. The one or more processors are communicatively connected to the stator antenna and are configured to monitor one or more electrical characteristics of the measurement signals that are received by the stator antenna from the rotor antenna over time as the shaft rotates and to determine rotational speed of the shaft based on recurrent variations in the one or more electrical characteristics.

20 Claims, 5 Drawing Sheets

SENSOR SYSTEM FOR A ROTOR ASSEMBLY

FIELD

The subject matter described herein relates to a sensor system incorporated with a rotor assembly to determine one or more properties of a rotating shaft of the rotor assembly.

BACKGROUND

Power-generating machines, such as internal combustion engines, motors, and generators, may include rotary assemblies featuring rotating shafts. It may be useful to monitor and measure certain properties of a rotating shaft within a power-generating machine to evaluate performance and/or health of the power-generating machine. For example, monitoring properties such as torque, temperature, rotating speed, and strain of the shaft may enable early detection of sub-optimal machine performance and/or components needing maintenance.

Monitoring multiple properties of the rotating shaft of a rotary assembly, such as torque and rotational speed, typically requires multiple discrete sensors that would have to be installed on or proximate to the shaft. For example, a torque sensor could be installed to measure torque, and a speed sensor could be installed to measure rotational speed. Utilizing multiple sensors to monitor a shaft in a power-generating machine may have several disadvantages. First, installing multiple sensors to monitor a shaft may be costly in terms of parts and installation. Second, due to limited space in the power-generating machine, it may be difficult to mount all of the sensors in position for monitoring the same shaft, especially with sensors that have active power components, such as batteries and/or energy harvesting devices, for powering the sensors. It may be prohibitively costly to attempt to retrofit a power-generating machine to provide additional clearance for incorporating multiple sensors. Third, the sensors may be exposed to harsh conditions in the power-generating machine, such as hot temperatures, high pressure, oil, corrosive materials, and the like during operation. The harsh conditions may negatively impact the accuracy of sensor measurements and/or the operational longevity of some of the sensors, such as the sensors that have active power components. A need remains for a sensor system that can be incorporated with a rotor assembly of a power-generating machine to accurately determine multiple properties of a rotating shaft and withstand harsh conditions.

SUMMARY

In one or more embodiments, a sensor system is provided that includes a rotor antenna, a radio frequency (RF) sensor, a stator antenna, and one or more processors. The rotor antenna is configured to be disposed on a shaft of a rotor assembly that includes the shaft and a stator member at least partially surrounding the shaft such that the shaft is configured to rotate relative to the stator member. The RF sensor is conductively connected to the rotor antenna and is configured to be disposed on the shaft. The RF sensor is configured to generate measurement signals. The stator antenna is mounted to the stator member and positioned radially outward from the rotor antenna. The stator antenna is wirelessly connected to the rotor antenna across an air gap. The one or more processors are communicatively connected to the stator antenna. The one or more processors are configured to monitor one or more electrical characteristics of the measurement signals that are received by the stator antenna from the rotor antenna over time as the shaft rotates and to determine rotational speed of the shaft based on recurrent variations in the one or more electrical characteristics.

In one or more embodiments, a method of determining one or more properties of a rotating shaft is provided. The method includes disposing a rotor antenna and a radio frequency (RF) sensor on a shaft of a rotor assembly. The rotor assembly includes a shaft and a stator member at least partially surrounding the shaft such that the shaft is configured to rotate relative to the stator member. The RF sensor is conductively connected to the rotor antenna and is configured to generate measurement signals. The method includes receiving the measurement signals at one or more processors stator antenna mounted to the stator member the stator antenna is positioned radially outward from the rotor antenna and wirelessly connected to the rotor antenna across an air gap to permit communication of the measurement signals from the rotor antenna to the stator antenna. The method also includes monitoring, via the one or more processors, one or more electrical characteristics of the measurement signals over time as the shaft rotates and determining a rotational speed of the shaft based on recurrent variations in the one or more electrical characteristics.

In one or more embodiments, a sensor system is provided that includes a stator antenna and one or more processors. The stator antenna is mounted to a stator member of a rotor assembly the rotor assembly includes the stator member and a shaft that is configured to rotate relative to the stator member. The stator antenna is configured to surround a portion of the shaft less than a full circumference of the shaft. The stator antenna is axially aligned with a rotor antenna that is mounted on the shaft and conductively connected to a radio frequency (RF) sensor on the shaft. The stator antenna is radially spaced apart from the rotor antenna and wirelessly connected to the rotor antenna across an air gap. The one or more processors are communicatively connected to the stator antenna and configured to monitor one or more electrical characteristics of measurement signals generated by the RF sensor. The measurement signals are received by the stator antenna from the rotor antenna over time as the shaft rotates. The one or more processors are configured to determine a rotational speed of the shaft based on recurrent variations in the one or more electrical characteristics.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
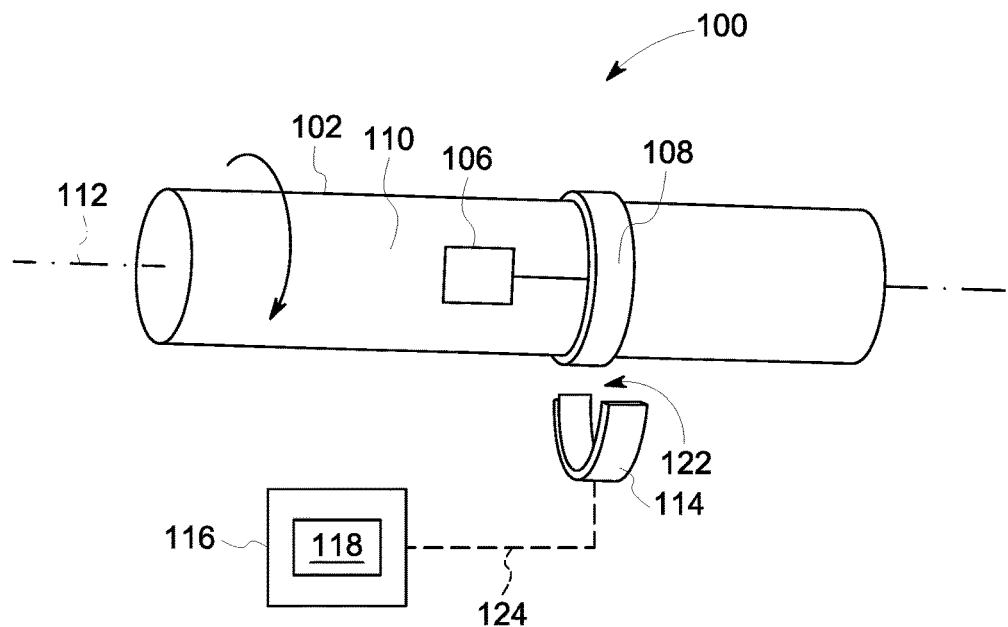
FIG. 1 is a schematic illustration of a sensor system incorporated with a shaft of a rotor assembly according to an embodiment.

The embodiments described herein provide a sensor system is configured to be incorporated with a rotor assembly that includes a rotating shaft. The sensor system is designed to determine by direct measurement or derivation one or more properties of the rotating shaft, including, for example, rotational speed, torque, strain, power output, temperature, and/or the like. The sensor system includes a rotor antenna and a radio frequency (RF) sensor that are disposed on the shaft of the rotor assembly. The RF sensor generates signals, referred to herein as measurement signals. The measurement signals are communicated by the rotor antenna across an air gap to a stator antenna that is wirelessly connected to the rotor antenna. One or more processors communicatively connected to the stator antenna monitor one or more electrical characteristics of the measurement signals over time as the shaft rotates. The electrical characteristics may include impedance, loss, bandwidth, noise, quality factor, or the like. The one or more processors are configured to determine a rotational speed of the shaft based on recurrent variations in the one or more electrical characteristics. The recurrent variations may be based on variability in the wireless communicative coupling between the stator antenna and the rotor antenna due to the rotor antenna rotating on the shaft relative to the stator antenna. The recurrent variations may represent a systematic profile that generally repeats every rotation of the shaft.

The rotor assemblies referred to herein are used broadly to refer to machinery that includes at least one rotating shaft which rotates relative to a static member, such as a housing or frame of the machinery. A rotor assembly may represent, or be a component of, an engine, a motor, a generator, a vehicle, an appliance, an industrial machine, or another machine with at least one rotating shaft.

In one or more embodiments, the RF sensor of the sensor system is a surface acoustic wave (SAW) sensor that is configured to measure strain on the shaft and/or temperature of the shaft. For example, the measurement signals generated by the sensor may indicate strain and/or temperature. The one or more processors may utilize the strain measurements to derive torque through the shaft. Therefore, the measurement signals may be separately analyzed to determine torque, temperature, and rotational speed. For example, one or more electrical characteristics of the measurement signals, such a frequency, may be used to derive torque and/or temperature, and recurrent variations in the electrical characteristics may be used to determine rotational speed. As a result, the single sensor system disclosed herein can be used to determine multiple properties of the rotating shaft based on measurement signals generated by a single RF SAW sensor.

Furthermore, the properties determined by the sensor system can be used to derive additional properties. For example, mechanical power output of the rotor assembly can be calculated based on the determined properties of rotational speed of the shaft and torque through the shaft. These properties, such as rotational speed and/or power output, can be used to control a power-generating machine, such as a combustion engine, a motor, a generator, or the like. For example, the sensor system may be integrated into an automatic feedback control loop that compares the determined (e.g., measured) values of a property, such as rotational speed or power output, to a designated value and changes an operating setting of the power-generating machine based on the comparison.

FIG. 1 is a schematic illustration of a sensor system 100 incorporated with a shaft 102 of a rotor assembly according to an embodiment. The sensor system 100 includes an RF sensor 106 disposed on the shaft 102 and a rotor antenna 108 disposed on the shaft 102. For example, both the RF sensor 106 and the rotor antenna 108 are rigidly secured (e.g., fixed in place) on an outer surface 110 of the shaft 102. The RF sensor 106 is conductively connected to the rotor antenna 108 via one or more wires, traces along a substrate, or the like. The shaft 102 is cylindrical and oriented along a length axis 112. The shaft 102 is configured to rotate clockwise and/or counterclockwise about the axis 112.

The sensor system 100 also includes a stator antenna 114 that is spaced apart from the shaft 102 and does not rotate with the shaft 102. For example, the rotor antenna 108 and the RF sensor 106 move relative to the stator antenna 114 as the shaft rotates. The stator antenna 114 is disposed radially outward from the rotor antenna 108 and is axially aligned with the rotor antenna 108, such that the rotor and stator antennas are located at substantially the same position (e.g., within a designated threshold range) along the length of the axis 112. The stator antenna 114 may be mounted on or to a stator member 120 (shown in FIGS. 2 through 4). The stator antenna 114 may be rigidly secured to the stator member 120. The rotor antenna 108 is radially separated from the stator antenna 114 by an air gap 122. The rotor antenna 108 is wirelessly, such as inductively, connected to the stator antenna 114 across the air gap 122.

The stator antenna 114 is communicatively connected to a controller 116 of the sensor system 100. The controller 116 includes one or more processors 118. The controller 116 is spaced apart from the shaft 102. The controller 116 may be connected to the stator antenna 114 via a wired or wireless pathway 124. In operation, the RF sensor 106 is configured to generate measurement signals as the shaft 102 spins or rotates. The measurement signals are communicated from the rotor antenna 108 to the stator antenna 114 across the air gap 122. The controller 116 (e.g., the one or more processors 118 thereof) monitors one or more electrical characteristics of the measurement signals over time as the shaft 102 rotates. The one or more processors 118 are configured to determine the rotational speed of the shaft 102 based on recurrent variations in the one or more electrical characteristics over time. The recurrent variations may define a cyclic or systematic profile that repeats every revolution of the shaft 102.

In an embodiment, the RF sensor 106 may be a passive sensor module that does not have an onboard or connected power source, such as a battery or energy harvesting device. The RF sensor 106 may be configured to generate the measurement signals in response to receiving stimulus signals such that the energy of the stimulus signals is utilized to power the generation and communication of the measurement signals. For example, the controller 116 may represent both an interrogator and a reader. As an interrogator, the controller 116 generates a stimulus signal and controls the transmission of the stimulus signal from the stator antenna 114 to the RF sensor 106 via the rotor antenna 108. The RF sensor 106 may generate a measurement signal upon receipt of the stimulus signal by utilizing the energy of the stimulus signal. As a reader, the controller 116 receives and analyzes the measurement signal that is generated by the RF sensor 106 responsive to receiving the stimulus signal. In an embodiment, all of the components of the sensor system 100 disposed on the shaft 102 are passive, which avoids mounting batteries or other active power components on or near the shaft 102. Such active power components may interfere with narrow clearances in the rotor assembly. Without having active power components, the shaft-mounted components of the sensor system 100 may be relatively thin and able to fit within narrow clearances between the shaft and the stator. Thus, the sensor system 100 may be able to be retrofit onto existing rotor assemblies that are not designed to accommodate sensors disposed on the shaft.

Although a single RF sensor 106 is shown in FIG. 1, the sensor system 100 may include multiple RF sensors 106 mounted at different locations on the shaft 102. For example, another RF sensor 106 may be disposed on the outer surface 110 of the shaft 102 at an opposite circumferential position relative to the visible RF sensor 106 (e.g., along a back-facing circumferential region of the shaft). Furthermore, the sensor system 100 optionally may include more than one rotor antenna 108 and more than one stator antenna 114 located at different axial locations along the length of the shaft 102. For example, the illustrated rotor antenna 108 and stator antenna 114 define a first wirelessly connected pair, and the sensor system 100 may include at least one other wirelessly connected pair spaced apart from the first wirelessly connected pair. For example, a second wirelessly connected pair may be configured to communicate measurement signals generated by a second RF sensor to the controller 116. The controller 116 may be configured to compare the measurement signals generated by the multiple different RF sensors 106 when determining one or more properties of the shaft 102, such as torque, bending, fatigue, stress, strain rate, or the like.

Figure 2:
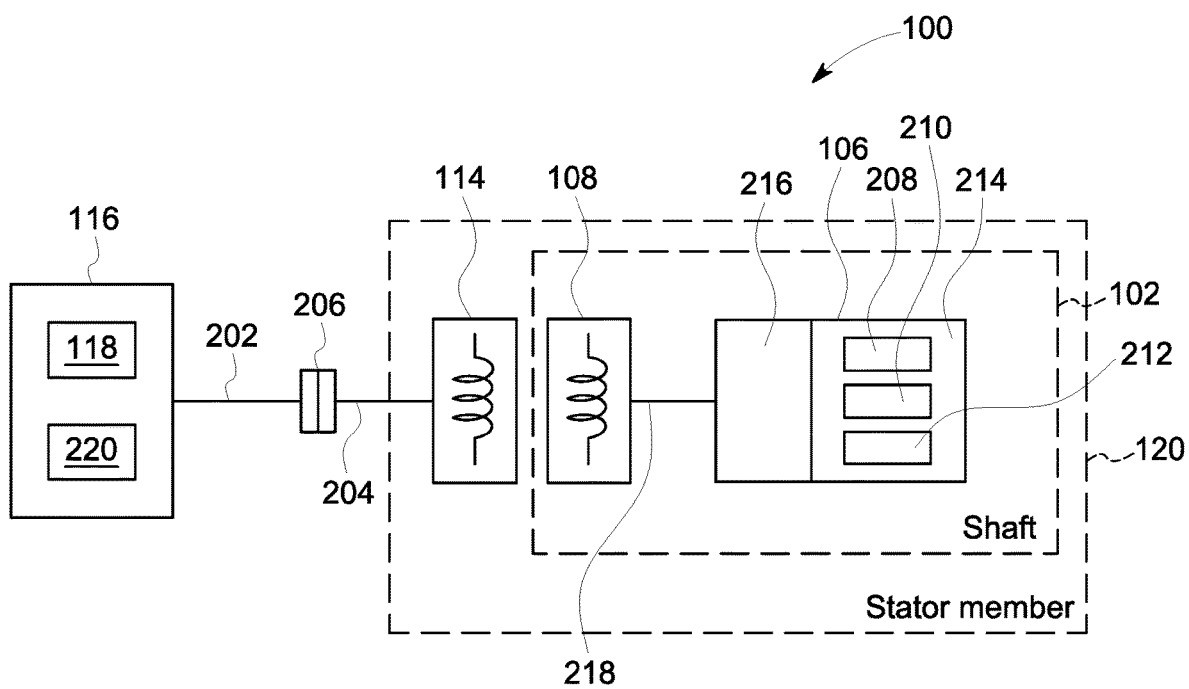
FIG. 2 is a block diagram of the sensor system according to an embodiment.

FIG. 2 is a block diagram of the sensor system 100 according to an embodiment. Optionally, the controller 116 may be remote from stator member 120 on which the stator antenna 114 is mounted. The controller 116 may be conductively connected to the stator antenna 114 by a first wire path 202 and a second wire path 204. Each of the wire paths 202, 204 may include or represent one or more wires, cables, optical fibers, or the like. The wire paths 202, 204 may be separably connected via a connector assembly 206. The first wire path 202 extends from the controller 116 to the connector assembly 206, and the second wire path 204 extends from the connector assembly 206 to the stator antenna 114. The rotor antenna 108 may be conductively connected to the RF sensor 106 via a wire path 218 along the shaft 102. Optionally, the rotor antenna 108 is directly connected to a portion of the RF sensor 106, such as a printed circuit board 216 or substrate of the RF sensor 106, such that there is no discrete wire traversing a space between the antenna 108 and the sensor 106.

The RF sensor 106 in the illustrated embodiment is a SAW sensor. The RF sensor 106 may be an all-quartz-package SAW sensor. For example, the sensor 106 may be sealed between a quartz substrate and a second quartz layer. The SAW sensor 106 may include a first strain resonator 208, a second strain resonator 210, and a temperature resonator 212. The resonators 208, 210, 212 may be disposed on a common substrate 214. The substrate 214 may include quartz. The substrate 214 may be affixed to the shaft 102 via an adhesive that is applied on an inner surface of the substrate 214 that faces the shaft 102. The SAW sensor 106 optionally includes the circuit board 216 that includes, or is connected to, the substrate 214. The location of the RF sensor 106 on the shaft 102 provides for direct measurement of one or more properties, such as strain and temperature, via the resonators 208, 210, 212. The strain measurements can be used to derive torque. Optionally, the strain resonators 208, 210 may be configured to resonate at different frequencies.

In an embodiment, the stimulus signals transmitted to via the antennas 108, 114 to the SAW sensor 106 may include a broad frequency spectrum. The SAW sensor 106 converts the electrical stimulus signals into acoustic signals that travel along the surface of the shaft 102. The measurement signals generated by the SAW sensor 106 may include the broad spectrum of the stimulus signal with nulls or voids in the spectrum that represent the frequencies at which the resonators 208, 210, 212 are resonating. The controller 116 can determine the resonating frequencies of the resonators 208, 210, 212 based on these nulls in the spectrum. The controller 116 is configured to determine one or more properties of the shaft 102, such as strain, torque, temperature, or the like, based on the determined resonating frequencies of the resonators 208, 210, 212. In an embodiment, the controller 116 is configured to determine the rotational speed of the shaft 102 based on recurrent variations in one or more characteristics of the measurement signals over time. For example, the resonating frequencies of the resonators 208, 210, 212 themselves may not be used to determine the speed, but the controller 116 may analyze recurrent variations in the measurement signals received from the sensor 106 to calculate the speed. Therefore, a different portion or aspect of the measurement signals may be used to determine the rotational speed as opposed to the portion or aspect of the measurement signals used to determine torque, temperature, strain, or other properties.

The one or more processors 118 of the controller 116 may include a microprocessor, a digital signal processor (DSP), an application specific integrated circuit (ASIC), a field programmable gate array (FPGA), or other programmable logic device, discrete gate or transistor logic, discrete hardware components, or any combination thereof designed and programmed to perform or cause the performance of the functions described herein. The controller 116 may include a local memory storage device 220 operably connected to the one or more processors 118. The local memory storage device 220 includes a computer readable medium, such as a random-access memory (RAM), a computer readable non-volatile medium (e.g., flash memory, EEPROM, NVRAM, FRAM), or the like. The memory 220 can store information that is accessible to the one or more processors 118. The information may include instructions (e.g., software) that can be executed by the one or more processors 118 to perform or cause the performance of the functions described herein.

Optionally, the memory 220 may store calibration information can be utilized by the one or more processors 118 to determine one or more properties of the shaft 102. The calibration information can provide a known or estimated relationship between the measured value and an actual, or more accurate, value. For example, the one or more processors 118 may be configured to utilize the calibration information with the determined resonating frequencies of the strain resonators 208, 210 to derive a torque through the shaft 102. Furthermore, the processors 118 may utilize the calibration information with the determined resonating frequency of the temperature resonator 212 to derive a temperature of the shaft 102.

Although the RF sensor 106 is described herein as a SAW sensor, such as an all-quartz package SAW sensor, in an alternative embodiment the RF sensor 106 may be different type of sensor, such as a strain gauge, temperature sensor (e.g., a thermocouple), an accelerometer, a speed sensor, or the like. The sensor system 100 described herein is not limited to SAW sensors.

Figure 3:
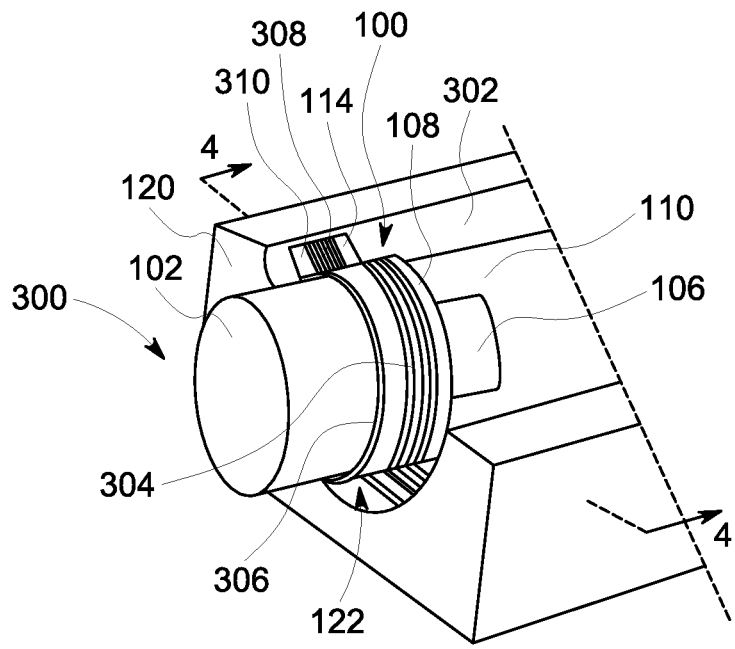
FIG. 3 illustrates a perspective view of a portion of a rotor assembly incorporated with the sensor system according to an embodiment.

FIG. 3 illustrates a perspective view of a portion of a rotor assembly 300 incorporated with the sensor system 100 according to an embodiment. The rotor assembly 300 includes the shaft 102 and the stator member 120. The stator member 120 at least partially surrounds the shaft 102. The shaft 102 rotates or spins relative to the stator member 120. The stator member 120 may be a housing, a bracket, a frame, or another structural element. Although the stator member 120 shown in FIG. 3 is semi-circular and surrounds approximately half of the circumference of the shaft 102, the stator member 120 may couple to another stator member such that the coupled combination fully surrounds the shaft 102. In an alternative embodiment, the stator member 120 may independently surround the full circumference of the shaft 102.

The rotor antenna 108 and RF sensor 106 are disposed on the outer surface 110 of the shaft 102. The stator antenna 114 is disposed along an inner surface 302 of the stator member 120. The inner surface 302 faces towards the shaft 102. The stator antenna 114 is radially located between the inner surface 302 and the rotor antenna 108 and is spaced apart from the rotor antenna 108 via the air gap 122. The stator antenna 114 surrounds at least a portion of the circumference of the shaft 102. The rotor antenna 108 extends around at least a portion of the circumference of the shaft 102.

The rotor antenna 108 may include at least one unshielded transmission line 304. Each unshielded transmission line 304 may be a coil of wire, a conductive trace embedded or printed on a substrate, or the like. The unshielded transmission line 304 may be composed of a metal material, such as copper, nickel, and alloys thereof. In the illustrated embodiment, the rotor antenna 108 includes a dielectric substrate 306 that secures the unshielded transmission line 304 to the shaft 102. The dielectric substrate 306 may be fixed in place on the shaft 102 via an adhesive or friction. In the illustrated embodiment, the rotor antenna 108 is an annular ring that extends around the full circumference of the shaft 102. Optionally, the rotor antenna 108 may include multiple unshielded transmission lines 304, with one line serving as a signal line and another line serving as a return line. The two transmission lines 304 may represent a differential line coupling such that the two lines are axially spaced apart along the length of the shaft 102, or a microstrip coupling such that the two lines are concentric with the dielectric substrate 306 disposed therebetween.

Like the rotor antenna 108, the stator antenna 114 may include at least one unshielded transmission line 308. Each unshielded transmission line 308 may be a coil of wire, a conductive trace embedded or printed on a substrate, or the like. The unshielded transmission line 304 may be composed of a metal material, such as copper, nickel, and alloys thereof. Optionally, the transmission line 308 may be secured directly to the inner surface 302 of the stator member 120. Alternatively, the transmission line(s) 308 may be secured to the stator member 120 via a dielectric substrate 310. Like the rotor antenna 108, the stator antenna 114 optionally may include multiple transmission lines 308, including at least one signal line and at least one return line for differential or microstrip coupling.

Figure 4:
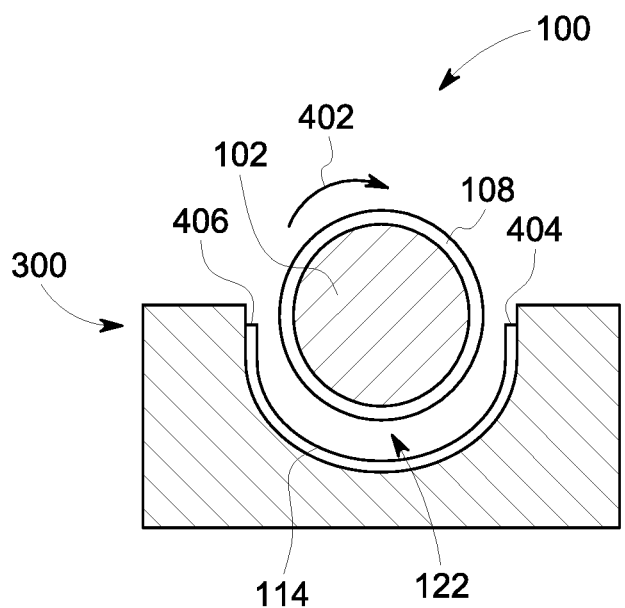
FIG. 4 is a cross-sectional end view of the rotor assembly and sensor system shown in FIG. 3.

FIG. 4 is a cross-sectional end view of the rotor assembly 300 and sensor system 100 shown in FIG. 3. The cross-section is taken along the line 4-4 in FIG. 3. Although the shaft 102 is shown being solid in FIG. 4, the shaft 102 optionally may be hollow. In one or more embodiments, at least one of the rotor antenna 108 or the stator antenna 114 does not annularly extend a full 360 degrees. In the illustrated embodiment, the stator antenna 114 does not annularly extend the full 360 degrees, such that the stator antenna 114 surrounds a portion of the shaft 102 less than the full circumference. For example, the stator antenna 114 is an arc that surrounds only a subset of the circumferential length of the shaft 102 in the circumferential direction 402. There is a portion of the shaft 102 along the circumference that faces away from the stator antenna 114 and is not surrounded by the stator antenna 114.

The stator antenna 114 may surround a percentage of the circumferential length of the shaft 102 that is different than the percentage of the circumferential length of the shaft 102 that the rotor antenna 108 extends around. For example, the rotor antenna 108 in FIG. 4 extends around the full circumference of the shaft 102, representing 100% of the circumferential length in the direction 402. The stator antenna 114 only surrounds about half of the circumference, approximately 50% of the circumferential length. As used herein, the term "approximately" to modify a numerical value indicates that the term encompasses values within a threshold range of the designated value, such as within 1%, 3%, 5% or the like above and/or below the value. In an alternative embodiment, the stator antenna 114 may fully surround the shaft 102 while the rotor assembly 108 does not fully surround the shaft 102. In another alternative embodiment, neither of the antennas 108, 114 fully surrounds the shaft 102.

Because at least one of the antennas 108, 114, which in this embodiment is the stator antenna 114, does not fully surround the shaft 102, the wireless RF coupling between the antennas 108, 114 varies with rotation of the shaft 102. For example, the coupling between the antennas 108, 114 may be referred to as non-symmetric. As the shaft 102 rotates clockwise for a series of revolutions, a given location on the rotor antenna 108 repeatedly is disposed away from the stator antenna 114 and then proximate to the stator antenna 114. For example, the given location on the rotor antenna 108 moves towards a first end 404 of the stator antenna 114, and is subsequently proximate to the stator antenna 114 until reaching an opposite, second end 406 of the stator antenna 114, from which position the location once again faces away from the stator antenna 114 until returning to the first end 404.

This non-symmetric coupling of the antennas 108, 114 affects the transmission of electrical signals (e.g., the measurement signals, stimulus signals, and the like) across the air gap 122. For example, some characteristics of the signal transmission, such as impedance, loss, bandwidth, noise, quality factor (also referred to as Q-factor), and/or the like, may repeatedly, recurrently change with rotation of the shaft 102. The Q-factor may represent a center frequency of the measurement signal divided by bandwidth. For example, the Q-factor may recurrently, systematically improve and then worsen. The variance in signal transmission between the antennas 108, 114 while the shaft 102 rotates is exploited by the controller 116 (shown in FIGS. 1 and 2) to determine the rotational speed of the shaft 102.

Figure 5:
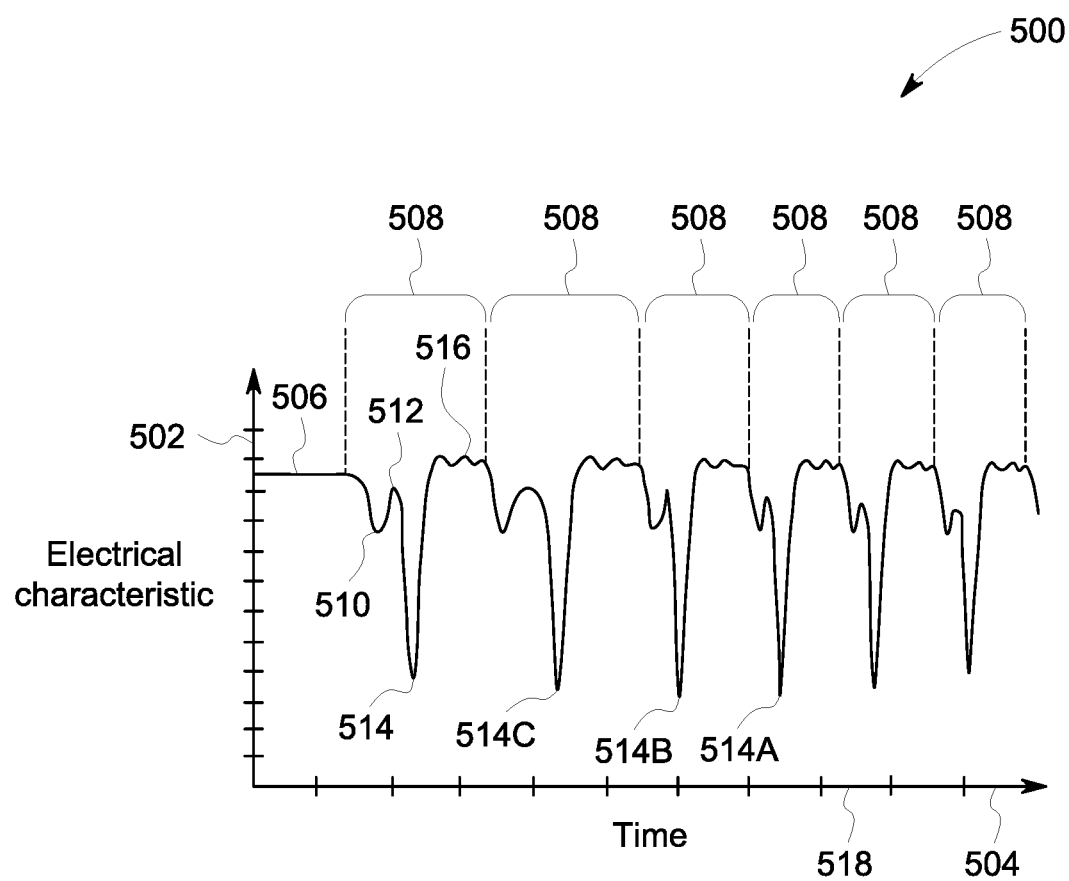
FIG. 5 is graph that plots an electrical characteristic of the measurement signals generated by a radio frequency (RF) sensor of the sensor system over time as the shaft rotates.

FIG. 5 is graph 500 that plots an electrical characteristic of the measurement signals generated by the RF sensor 106 of the sensor system 100 over time as the shaft 102 rotates. The electrical characteristic may be monitored by the controller 116. For example, the vertical axis 502 represents the electrical characteristic, and the horizontal axis 504 represents time. As described above, the controller 116 may receive the measurement signals from the stator antenna 114, which wirelessly receives the measurement signals from the rotor antenna 108 on the shaft 102 across the air gap 122. The electrical characteristic may represent one or more of impedance, loss, bandwidth, noise, quality factor (also referred to as Q-factor), and/or the like. The electrical characteristic varies over time due to the non-symmetric coupling of the antennas 108, 114 and the rotating shaft 102. The electrical characteristic is plotted as a plotline 506. In a non-limiting example, the electrical characteristic may be the Q-factor.

The measurement signals may be generated by the sensor system 100 more frequently than revolutions of the shaft 102. In a non-limiting example, a new measurement signal may be received at the controller 116 every 200 microseconds, which translates to 5000 measurement signals per second. The rotational speed of the shaft 102 may be in the range of a few dozen to a few hundred revolutions per second. For example, if the sensor system 100 generates 5000 measurement signals per second and the shaft 102 rotates at 3600 revolutions per minute (RPM), the controller 116 would be able to analyze over 80 measurement signals (e.g., data points) per revolution.

The plotline 506 shows recurrent variations in the electrical characteristic. The recurrent variations define a cyclic profile 508 which repeats every revolution of the shaft 102. For example, in the graph 500, the cyclic profile 508 includes a short dip or canyon 510, then a short peak 512. The short peak 512 is followed by a deep, narrow nadir 514, which is followed by a broad plateau 516. The cyclic profile 508 then repeats such that the short dip 510 follows the broad plateau 516. Due to the non-symmetric coupling of the antennas 108, 114, each cyclic profile 508 may represent a discrete revolution of the shaft 102. Although the individual elements 510, 512, 514, 516 of the cyclic profile 208 may vary from one cyclic profile 208 to another cyclic profile 208, one or more of these shared elements 510, 512, 514, 516 can be used as an indicator or marker to indicate each subsequent cyclic profile 208, and therefore each subsequent revolution.

The controller 116 (e.g., the one or more processors 118 thereof) may derive the rotational speed of the shaft 102 based on the duration of the cyclic profile 508 and/or the frequency at which the cyclic profile 508 repeats. For example, to determine the speed of the shaft 102 at a given time 518, the controller 116 may determine the elapsed length of the most recent cyclic profile. As an easy measuring stick, the controller 116 may determine the amount of time between the most recent two deep nadirs 514, which can represent the duration of the last cyclic profile. For example, if the last two nadirs 514A, 514B were 0.02 sec apart, then the shaft 102 made the last revolution in 0.002 sec, which translates to a rotational speed of 3000 RPMs (e.g., 1 rev/0.02 sec*60 sec/1 min). Optionally, the controller 116 may take the average of multiple recent cyclic profiles 508 to determine the rotational speed of the shaft 102, such as two, three, four, or more recent cyclic profiles. For example, the controller 116 may calculate the elapsed time from the nadir 514C to the nadir 514A, which represents the prior two cyclic profiles 508, and then divide the elapsed time by two to derive the rotational speed as described above. Because the cyclic profiles are based on time, the rotational speed of the shaft 102 can be calculated directly without the requiring calibration, look-up tables, computer models, historical data, or the like.

The controller 116 may be configured to control the operation of the rotor assembly 300, or a power-generating machine that includes the rotor assembly 300, based on the determined rotational speed of the shaft 102 by the sensor system 100. For example, upon determining the rotational speed, the controller 116 may generate a control signal configured to change an operating setting of the rotor assembly 300 and/or power-generating machine. The operating setting may include a power setting, a thrust setting, a speed setting, or the like. For example, the controller 116 may compare the determined rotational speed of the shaft 102 to a designated rotational speed, which may be stored in the memory 220 (shown in FIG. 2). The designated rotational speed may represent a desired or pre-selected speed. If the determine rotational speed differs from the designated rotational speed by more than a threshold range, such as 5%, 10%, of the like, the controller 116 may generate the control signal to change the operating setting for causing the rotational speed to better match the designated speed. For example, if the determined speed by the sensor system 100 is greater than the designated speed by more than the threshold range, then the controller 116 may change an operating setting to cause the shaft 102 to slow down. Alternatively, if the determined speed is lower than the designated speed, then the controller 116 may change an operating setting to accelerate the rotation of the shaft 102.

The controller 116 may be configured to derive or calculate additional parameters of the rotor assembly 300 based on the determined rotational speed of the shaft 102. For example, mechanical power (e.g., power output) is torque times rotational speed. As described above, the RF sensor 106 may be a strain sensor, such as a SAW sensor, that is configured to measure strain for deriving torque through the shaft 102. Therefore, the sensor system 100 may separately determine the torque and the rotational speed, and then the controller 116 can calculate the power output of the rotor assembly 300 based on these two parameters (e.g., by multiplying the torque times rotational speed). Therefore, the single sensor system 100 disclosed herein, using a single type of passive RF sensor 106, can be used to determine multiple parameters of the shaft, such as the torque, rotational speed, and the power output.

The controller 116 may be configured to control the rotor assembly 300, or a power-generating machine that includes the rotor assembly 300, based on the power output that is calculated by the sensor system 100. Similar to the control operation described above with respect to the determined rotational speed, the rotor assembly 300 or power-generating machine may have a designated power rating. For example, the designated power rating may be specified by a manufacturer, may be selected by a user via an input device, or the like. The controller 116 can compare the determined power output from the sensor system 100 to the designated power rating and generate control signals based on discrepancies between the two values. For example, the controller 116 may be configured to change an operating setting of the rotor assembly 300 or power-generating machine based on whether the determined power output is greater than the designated power rating or less than the designated power rating. The sensor system 100 can be used to ensure that the rotor assembly 300 and/or the power-generating machine operate at (e.g., within given threshold ranges of) the designated rotational speed and/or designated power rating.

Figure 6:
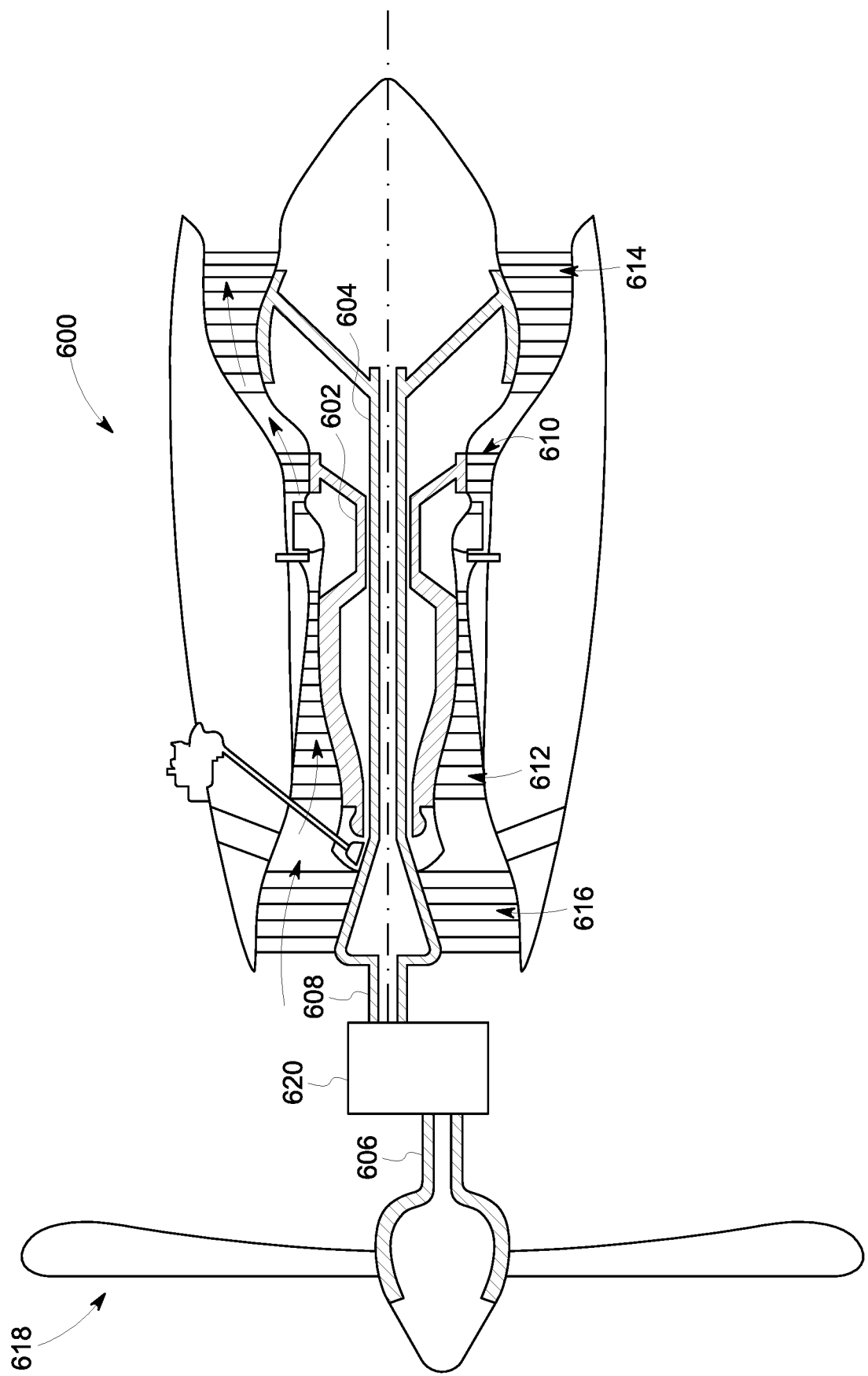
FIG. 6 is a schematic cross-sectional view of a power-generating machine according to an embodiment.

FIG. 6 is a schematic cross-sectional view of a power-generating machine 600 according to an embodiment. The power-generating machine 600 is a combustion engine. In a non-limiting example, the engine may be a high bypass turboprop type engine. The engine in other non-limiting examples may include or represent other turbine-powered engines, such as a turboshaft engine, a turbofan engine, or the like. The sensor system 100 shown in FIGS. 1 through 5 may be incorporated into the power-generating machine 600. For example, the machine 600 includes various rotating shafts, such as a high pressure shaft 602, a low pressure shaft 604, a fan shaft 606, and an engine coupling shaft 608. The high-pressure shaft 602 connects a high-pressure turbine 610 to a high-pressure compressor 612. The lower pressure shaft 604 connects a low-pressure turbine 614 to a low-pressure compressor 616. The fan shaft 606 connects to a fan section or propeller 618. The engine coupling shaft 608 connects a speed reduction device 620 to the low-pressure shaft 604. These shafts 602, 604, 606, 608 may represent different rotor assemblies or different components of a single rotor assembly. The sensor system 100 may be incorporated with at least one of these shafts 602, 604, 606, 608 to monitor properties of the shafts such as, but not limited to, rotational speed. As described above, the controller 116 may be configured to control operation of the power-generating machine 600 based on the properties determined by the sensor system 100.

Although the power-generating machine 600 shown in FIG. 6 is a combustion engine, the sensor system 100 described herein may be incorporated with other types of machines that include rotor assemblies (e.g., rotating shafts). Such machines may include motors, generators, other types of engines, and the like.

Figure 7:
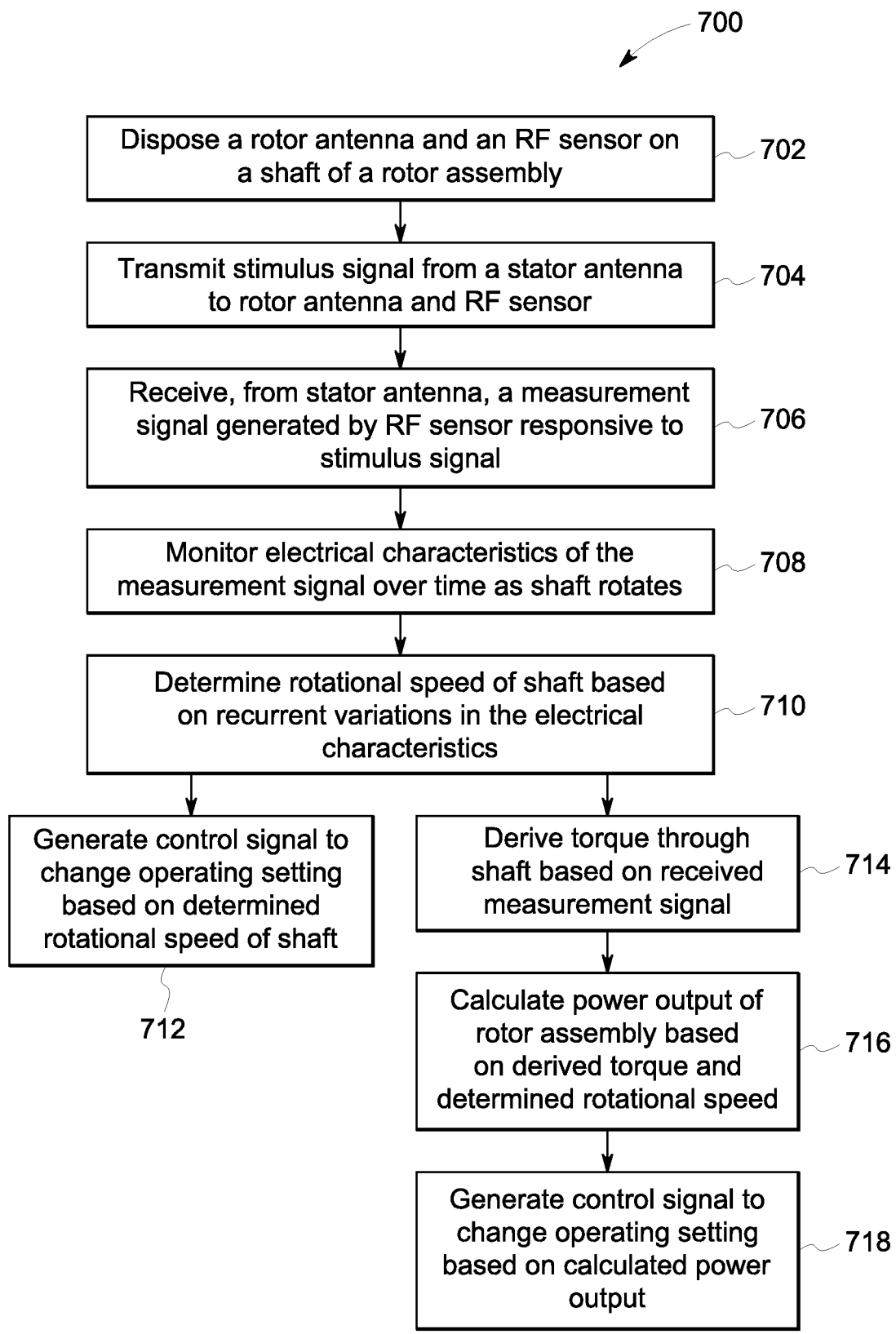
FIG. 7 is a flow chart for a method of determining one or more properties of a rotating shaft, such as rotational speed, according to an embodiment.

FIG. 7 is a flow chart for a method 700 of determining one or more properties of a rotating shaft, such as rotational speed, according to an embodiment. The method 700 may be performed, at least in part, by the controller 116 of the sensor system 100 described with reference to FIGS. 1 through 6. Optionally, the method 700 may include additional steps not shown in FIG. 7, fewer steps than shown in FIG. 7, different steps than shown in FIG. 7, and/or the steps may be performed in a different order than shown in FIG. 7.

At 702, a rotor antenna 108 and a radio frequency (RF) sensor 106 are disposed on a shaft 102 of a rotor assembly 300. For example, the rotor antenna 108 and the RF sensor 106 may be mounted directly on an outer surface 110 of the shaft 102. Optionally, at 704, a stimulus signal is transmitted from a stator antenna 114 to the rotor antenna 108 and the RF sensor 106. For example, the stator antenna 114 may wirelessly transmit (e.g., induct) the stimulus signal across an air gap to the rotor antenna 108, which conveys the signal to the RF sensor 106. The shaft 102 rotates relative to the stator antenna 114, which may be mounted on a stator member 120.

At 706, a measurement signal is received from the stator antenna 114. The measurement signal is generated by the RF sensor 106 responsive to the stimulus signal. For example, the RF sensor 106 may be a passive device utilizes the energy in the stimulus signal to generate and convey the measurement signal from the rotor antenna 108 to the stator antenna 114 across the air gap. The RF sensor 106 may be a SAW sensor includes multiple resonators on a quartz substrate.

At 708, electrical characteristics of the measurement signal are monitored over time as the shaft 102 rotates. The characteristics may include one or more of impedance, loss, bandwidth, noise, or Q-factor. At 710, the rotational speed of the shaft 102 is determined based on recurrent variations in the electrical characteristics that are monitored. For example, the recurrent variations may define a cyclic profile that repeats every revolution of the shaft 102.

Optionally, at 712, a control signal may be generated to change an operating setting based on the determined rotational speed of the shaft. Optionally, at 714, torque through the shaft may be derived based on the received measurement signal. At 716, power output of the rotor assembly 300 may be calculated based on the derived torque and determined rotational speed of the shaft 102. At 718, a control signal may be generated to change an operating setting based on the calculated power output. The operating setting described in steps 712 and 718 may be a setting for a power-generating machine that includes the rotor assembly 300, such as a combustion engine, a motor, a generator, or the like.

At least one technical effect of the embodiments described herein includes the ability to utilize a single sensor system or platform to determine multiple different properties of a rotating shaft including, for example, rotational speed, torque, temperature, and power output. Another technical effect is the ability to simply and efficiently incorporate the sensor system into a rotor assembly that is not specifically designed for accommodating sensors. For example, the sensor system described herein may include narrow, light-weight passive components that are mounted on the shaft, such that the components do not obstruct or otherwise interfere with the operation of the rotor assembly. Furthermore, the sensor system can be utilized in harsh environments such as within power-generating prime movers, such as engines, motors, generators, and the like.

In one or more embodiments, a sensor system is provided that includes a rotor antenna, a radio frequency (RF) sensor, a stator antenna, and one or more processors. The rotor antenna is configured to be disposed on a shaft of a rotor assembly that includes the shaft and a stator member at least partially surrounding the shaft such that the shaft is configured to rotate relative to the stator member. The RF sensor is conductively connected to the rotor antenna and configured to be disposed on the shaft. The RF sensor is configured to generate measurement signals. The stator antenna is mounted to the stator member and positioned radially outward from the rotor antenna. The stator antenna is wirelessly connected to the rotor antenna across an air gap. The one or more processors are communicatively connected to the stator antenna. The one or more processors are configured to monitor one or more electrical characteristics of the measurement signals that are received by the stator antenna from the rotor antenna over time as the shaft rotates and to determine a rotational speed of the shaft based on recurrent variations in the one or more electrical characteristics.

Optionally, the recurrent variations in the one or more electrical characteristics of the measurement signals define a cyclic profile that repeats every revolution of the shaft.

Optionally, the rotor antenna is configured to extend around a full circumference of the shaft.

Optionally, the stator antenna is configured to surround a portion of the shaft less than a full circumference of the shaft.

Optionally, the rotor antenna is configured to extend around a first percentage of a full circumference of the shaft and the stator antenna is configured to surround a second percentage of the full circumference of the shaft. The first percentage is different than the second percentage.

Optionally, the RF sensor is an all-quartz-package surface acoustic wave sensor.

Optionally, the RF sensor includes a first strain resonator, a second strain resonator, and a temperature resonator.

Optionally, the rotor assembly is a component of a power-generating machine and the one or more processors are further configured to change an operating setting of the power-generating machine based on the rotational speed of the shaft that is determined.

Optionally, the one or more processors are configured to use the measurement signals generated by the RF sensor to derive one or more properties of the shaft. The one or more properties include one or more of strain, torque, or temperature.

Optionally, the one or more processors are configured to use the measurement signals generated by the RF sensor to derive a torque through the shaft. The one or more processors are configured to calculate a power output of the rotor assembly based on the torque that is derived and the rotational speed of the shaft. Optionally, the rotor assembly is a component of a power-generating machine and the one or more processors are further configured to change an operating setting of the power-generating machine based on the power output that is calculated.

Optionally, the one or more electrical characteristics of the measurement signals include one or more of impedance, loss, bandwidth, noise, or quality factor.

Optionally, the RF sensor is passive and is configured to generate the measurement signals in response to receiving stimulus signals from the rotor antenna. The rotor antenna receives the stimulus signals from the stator antenna across the air gap.

In one or more embodiments, a method of determining one or more properties of a rotating shaft is provided. The method includes disposing a rotor antenna and a radio frequency (RF) sensor on a shaft of a rotor assembly. The rotor assembly includes the shaft and a stator member at least partially surrounding the shaft such that the shaft is configured to rotate relative to the stator member. The RF sensor is conductively connected to the rotor antenna and configured to generate measurement signals. The method includes receiving the measurement signals at one or more processors from a stator antenna mounted to the stator member. The stator antenna is positioned radially outward from the rotor antenna and wirelessly connected to the rotor antenna across an air gap to permit communication of the measurement signals from the rotor antenna to the stator antenna. The method includes monitoring, via the one or more processors, one or more electrical characteristics of the measurement signals over time as the shaft rotates and determining a rotational speed of the shaft based on recurrent variations in the one or more electrical characteristics.

Optionally, the rotor assembly is a component of a power-generating machine. The method further includes generating a control signal configured to change an operating setting of the power-generating machine based at least in part on the rotational speed of the shaft that is determined.

Optionally, the method further includes deriving, via the one or more processors, a torque through the shaft using the measurement signals generated by the RF sensor and calculating a power output of the rotor assembly based on the torque that is derived and the rotational speed of the shaft.

Optionally, the method further includes transmitting stimulus signals from the stator antenna to the RF sensor via the rotor antenna. The RF sensor is configured to generate the measurement signals responsive to receiving the stimulus signals.

In one or more embodiments, a sensor system is provided that includes a stator antenna and one or more processors. The stator antenna is mounted to a stator member of a rotor assembly. The rotor assembly includes the stator member and a shaft that is configured to rotate relative to the stator member. The stator antenna is configured to surround a portion of the shaft less than a full circumference of the shaft. The stator antenna is axially aligned with a rotor antenna that is mounted on the shaft and conductively connected to a radio frequency (RF) sensor on the shaft. The stator antenna is radially spaced apart from the rotor antenna and wirelessly connected to the rotor antenna across an air gap. The one or more processors are communicatively connected to the stator antenna and are configured to monitor one or more electrical characteristics of measurement signals generated by the RF sensor. The measurement signals are received by the stator antenna from the rotor antenna over time as the shaft rotates. The one or more processors are configured to determine a rotational speed of the shaft based on recurrent variations in the one or more electrical characteristics.

Optionally, the one or more processors are configured to generate a control signal for changing an operating setting of a power-generating machine based at least in part on the rotational speed of the shaft that is determined.

Optionally, the one or more processors are configured to use the measurement signals generated by the RF sensor to derive a torque through the shaft. The one or more processors are configured to calculate a power output of the rotor assembly based on the torque that is derived and the rotational speed of the shaft.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
   a rotor antenna configured to be disposed on a shaft of a rotor assembly that includes the shaft and a stator member at least partially surrounding the shaft such that the shaft is configured to rotate relative to the stator member;
   a radio frequency (RF) sensor conductively connected to the rotor antenna and configured to be disposed on the shaft, the RF sensor configured to generate measurement signals;
   a stator antenna mounted to the stator member and positioned radially outward from the rotor antenna, the stator antenna wirelessly connected to the rotor antenna across an air gap; and
   one or more processors communicatively connected to the stator antenna, the one or more processors configured to monitor one or more electrical characteristics of the measurement signals that are received by the stator antenna from the rotor antenna over time as the shaft rotates and to determine a rotational speed of the shaft based on recurrent variations in the one or more electrical characteristics.

2. The sensor system of claim 1, wherein the recurrent variations in the one or more electrical characteristics of the measurement signals define a cyclic profile that repeats every revolution of the shaft.

3. The sensor system of claim 1, wherein the rotor antenna is configured to extend around a full circumference of the shaft.

4. The sensor system of claim 1, wherein the stator antenna is configured to surround a portion of the shaft less than a full circumference of the shaft.

5. The sensor system of claim 1, wherein the rotor antenna is configured to extend around a first percentage of a full circumference of the shaft and the stator antenna is configured to surround a second percentage of the full circumference of the shaft, wherein the first percentage is different than the second percentage.

6. The sensor system of claim 1, wherein the RF sensor is an all-quartz-package surface acoustic wave sensor.

7. The sensor system of claim 1, wherein the RF sensor includes a first strain resonator, a second strain resonator, and a temperature resonator.

8. The sensor system of claim 1, wherein the rotor assembly is a component of a power-generating machine and the one or more processors are further configured to change an operating setting of the power-generating machine based on the rotational speed of the shaft that is determined.

9. The sensor system of claim 1, wherein the one or more processors are configured to use the measurement signals generated by the RF sensor to derive one or more properties of the shaft, the one or more properties including one or more of strain, torque, or temperature.

10. The sensor system of claim 1, wherein the one or more processors are configured to use the measurement signals generated by the RF sensor to derive a torque through the shaft, and the one or more processors are configured to calculate a power output of the rotor assembly based on the torque that is derived and the rotational speed of the shaft.

11. The sensor system of claim 10, wherein the rotor assembly is a component of a power-generating machine and the one or more processors are further configured to change an operating setting of the power-generating machine based on the power output that is calculated.

12. The sensor system of claim 1, wherein the one or more electrical characteristics of the measurement signals include one or more of impedance, loss, bandwidth, noise, or quality factor.

13. The sensor system of claim 1, wherein the RF sensor is passive and is configured to generate the measurement signals in response to receiving stimulus signals from the rotor antenna, the rotor antenna receiving the stimulus signals from the stator antenna across the air gap.

14. A method comprising:
    disposing a rotor antenna and a radio frequency (RF) sensor on a shaft of a rotor assembly, the rotor assembly including the shaft and a stator member at least partially surrounding the shaft such that the shaft is configured to rotate relative to the stator member, the RF sensor conductively connected to the rotor antenna and configured to generate measurement signals;
    receiving the measurement signals at one or more processors from a stator antenna mounted to the stator member, the stator antenna positioned radially outward from the rotor antenna and wirelessly connected to the rotor antenna across an air gap to permit communication of the measurement signals from the rotor antenna to the stator antenna;
    monitoring, via the one or more processors, one or more electrical characteristics of the measurement signals over time as the shaft rotates; and
    determining a rotational speed of the shaft based on recurrent variations in the one or more electrical characteristics.

15. The method of claim 14, wherein the rotor assembly is a component of a power-generating machine, and the method further includes generating a control signal configured to change an operating setting of the power-generating machine based at least in part on the rotational speed of the shaft that is determined.

16. The method of claim 14, further comprising deriving, via the one or more processors, a torque through the shaft using the measurement signals generated by the RF sensor, and calculating a power output of the rotor assembly based on the torque that is derived and the rotational speed of the shaft.

17. The method of claim 14, further comprising transmitting stimulus signals from the stator antenna to the RF sensor via the rotor antenna, the RF sensor configured to generate the measurement signals responsive to receiving the stimulus signals.

18. A sensor system comprising:
    a stator antenna mounted to a stator member of a rotor assembly, the rotor assembly including the stator member and a shaft that is configured to rotate relative to the stator member, the stator antenna configured to surround a portion of the shaft less than a full circumference of the shaft, the stator antenna axially aligned with a rotor antenna that is mounted on the shaft and conductively connected to a radio frequency (RF) sensor on the shaft, the stator antenna radially spaced apart from the rotor antenna and wirelessly connected to the rotor antenna across an air gap; and one or more processors communicatively connected to the stator antenna and configured to monitor one or more electrical characteristics of measurement signals generated by the RF sensor, the measurement signals received by the stator antenna from the rotor antenna over time as the shaft rotates, wherein the one or more processors are configured to determine a rotational speed of the shaft based on recurrent variations in the one or more electrical characteristics.

19. The sensor system of claim 18, wherein the one or more processors are configured to generate a control signal for changing an operating setting of a power-generating machine based at least in part on the rotational speed of the shaft that is determined.

20. The sensor system of claim 18, wherein the one or more processors are configured to use the measurement signals generated by the RF sensor to derive a torque through the shaft, and the one or more processors are configured to calculate a power output of the rotor assembly based on the torque that is derived and the rotational speed of the shaft.

* * * * *